United States Patent
Stillman et al.

(10) Patent No.: US 10,179,621 B2
(45) Date of Patent: Jan. 15, 2019

(54) WHEEL TELEMETRY MONITORING SYSTEM

(71) Applicants: Kurt Stillman, Oro Valley, AZ (US); Chris Harriman, Tucson, AZ (US)

(72) Inventors: Kurt Stillman, Oro Valley, AZ (US); Chris Harriman, Tucson, AZ (US)

(*) Notice: Subject to any disclaimer, the term of this patent is extended or adjusted under 35 U.S.C. 154(b) by 0 days.

(21) Appl. No.: 15/707,501

(22) Filed: Sep. 18, 2017

(65) Prior Publication Data
US 2018/0079461 A1 Mar. 22, 2018

Related U.S. Application Data

(60) Provisional application No. 62/396,027, filed on Sep. 16, 2016.

(51) Int. Cl.
| | |
|---|---|
| *B62H 5/00* | (2006.01) |
| *B62H 5/20* | (2006.01) |
| *G06K 19/07* | (2006.01) |
| *H04W 4/02* | (2018.01) |
| *B62J 99/00* | (2009.01) |

(52) U.S. Cl.
CPC ............ *B62H 5/20* (2013.01); *G06K 19/0717* (2013.01); *H04W 4/027* (2013.01); *B62J 2099/002* (2013.01); *B62J 2099/004* (2013.01); *B62J 2099/0013* (2013.01); *B62K 2207/00* (2013.01); *B62K 2208/00* (2013.01)

(58) Field of Classification Search
CPC ..... B62H 5/20; G06K 19/0717; H04W 4/027; B62J 2099/0013; B62J 2099/004; B62K 2207/00; B62K 2208/00

USPC ..................................................... 73/862.325
See application file for complete search history.

(56) References Cited

U.S. PATENT DOCUMENTS

| | | | | |
|---|---|---|---|---|
| 6,157,890 | A * | 12/2000 | Nakai | B62J 99/00 340/988 |
| 6,490,507 | B1 * | 12/2002 | Campagnolo | B62J 99/00 116/62.1 |
| 2012/0330572 | A1 * | 12/2012 | Longman | B62M 3/00 702/44 |
| 2013/0144464 | A1 * | 6/2013 | Dorogusker | A63B 24/0062 701/1 |
| 2016/0023081 | A1 * | 1/2016 | Popa-Simil | A63B 69/16 700/91 |
| 2017/0003311 | A1 * | 1/2017 | Lay | G01C 22/002 |
| 2017/0097375 | A1 * | 4/2017 | Liu | G01P 15/0802 |

(Continued)

*Primary Examiner* — Masoud H Noori

(57) ABSTRACT

A wheel telemetry system providing a set of riding information to a rider, while riding a bicycle, by measuring the acceleration of the wheel(s) of the bicycle with respect to one or more of the x-, y-, or z-axes is disclosed. The system features a wheel-mounted portion and a control unit in wireless communication. The wheel-mounted portion is attached to one or both bicycle wheels and comprises an accelerometer, pressure sensor, and/or temperature sensor as well as a programmable microcontroller. The accelerometer monitors the movement of the wheel(s) in one or more of the x-, y-, and z-planes. Accelerometer data, (and optionally the tire pressure data and/or the temperature data), is transmitted to the control unit for monitoring and/or data logging. Movement of a previously motionless bicycle may also be used to trigger an alarm when the control unit is not detected within a predetermined distance from the bicycle.

19 Claims, 2 Drawing Sheets

(56) References Cited

U.S. PATENT DOCUMENTS

| | | | |
|---|---|---|---|
| 2017/0115319 A1* | 4/2017 | Ookubo | G01P 3/487 |
| 2017/0295319 A1* | 10/2017 | Komemushi | A42B 3/0426 |
| 2017/0334522 A1* | 11/2017 | Zahid | B62M 25/08 |
| 2017/0371335 A1* | 12/2017 | Xie | B62K 11/007 |

* cited by examiner

WHEEL TELEMETRY MONITORING SYSTEM

CROSS REFERENCE

This application claims priority to U.S. Provisional Patent Application No. 62/396,027 filed Sep. 16, 2016, the specification of which is incorporated herein in its entirety by reference.

FIELD OF THE INVENTION

The present invention relates to bicycle wheel telemetry systems, more particularly, to a system for monitoring rider performance by providing the rotation speed (in rotations per minute) of one or both wheels, a riding surface, a ground speed, and/or sudden acceleration/deceleration events based on the acceleration of the wheel(s) with respect to the x-, y-, and/or z-axes.

BACKGROUND OF THE INVENTION

In professional biking, riders are in constant search of methods to monitor and increase performance. The present invention provides the monitoring of the acceleration of a wheel(s) in one or more axes. In this way, many aspects of both bicycle and rider performance can be presented to the rider or stored for future review.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a wheel telemetry system providing a set of riding information to a rider while riding a bicycle by measuring the acceleration of the wheel with respect to one or more of the x-, y-, or z-axes, defined with respect to the wheel. The set of riding information may aide the rider in monitoring riding performance by providing data comprising a rotation speed of the wheel, a type of riding surface, a ground speed of the bicycle, sudden acceleration/deceleration events, or combinations thereof. In some embodiments, the system comprises a wireless electronic device attached to a wheel of the bicycle. It may be appreciated that different configurations are possible. For example, the wireless electronic device may be attached to either the wheel, or to the rear wheel, or alternatively, both the front and rear wheels may each have a wireless electronic device disposed thereon. Thus, the term wheel(s) is widely employed.

In further embodiments, the wireless electronic device comprises an accelerometer having an on-board motion activated logic processor and a first memory repository operatively connected to said logic processor. In an embodiment, the first memory repository stores a set of movement patterns defining allowable movements of the wheel(s) that will activate the accelerometer to sense and collect a set of movement data. In preferred embodiments, the set of movement data comprises the measurement of the acceleration. In an embodiment, a default mode of the accelerometer is a sensing mode.

In additional embodiments, the wireless electronic device further comprises a first microcontroller operatively connected to the accelerometer and a first transceiver antenna operatively connected to the first microcontroller. In an embodiment, a radio modem is integrated into the first microcontroller.

In supplementary embodiments, a control unit is wirelessly connected to the wireless electronic device. In exemplary embodiments, the control unit comprises a second transceiver antenna wirelessly connected to the first transceiver antenna, a second microcontroller operatively coupled to the second transceiver antenna, a display interface operatively connected to the second microcontroller, and a second memory repository operatively connected to the display interface.

Consistent with previous embodiments, when the accelerometer senses a movement of the wheel(s), the accelerometer transmits a first signal to wake up the logic processor. The logic processor may then acquire the movement and compare the movement to each movement pattern in the set of movement patterns. In some embodiments, if the movement does not fit any movement pattern, then the accelerometer continues to operate in the sensing mode and the first microcontroller and control unit continue in the inactive sleep mode. In this way, the system is kept from processing and storing data resulting from minor or accidental movements of the bicycle, thus saving system power. Further, if the movement of the wheel(s) does fit one of the movement patterns, then the logic processor may send a second signal to wake up the first microcontroller and the accelerometer may collect the set of movement data. In other embodiments, the set of movement data is modulated by the radio modem of the first microcontroller to produce a set of modulated data. The first transceiver antenna may then transmit the set of modulated data to the second transceiver antenna, which subsequently transmits the set of modulated data to the second microcontroller. In further embodiments, the set of modulated data is demodulated and processed by the second microcontroller to produce the set of riding information. The set of riding information may then be communicated to the rider, while riding the bicycle, via the display interface and/or stored by the second memory repository for future review. In additional embodiments, the display interface communicates the set of riding information to the rider via an audio, visual, and/or haptic alert.

Current bicycle telemetry requires large externally mounted sensors and proper alignment. One of the unique and inventive technical features of the present invention is its small size, only one device needs to be attached to one or both bike wheels. Without wishing to limit the invention to any theory or mechanism, it is believed that the technical feature of the present invention advantageously provides for easy installation and ease of portability between multiple bicycles. Further, the small size of the present device would have minimal to low effect on the balance of the bike wheel(s). In contrast, the larger sensors would require some counterbalance, which would further add weight to a bike. This advantage is particularly significant for cycling bikes, where a primary goal of cyclists is to reduce the weight of the bike as much as possible. None of the presently known prior references or work has the unique inventive technical feature of the present invention.

BRIEF DESCRIPTION OF THE DRAWINGS

The features and advantages of the present invention will become apparent from a consideration of the following detailed description presented in connection with the accompanying drawings in which.

DETAILED DESCRIPTION OF THE INVENTION

Figure 1:
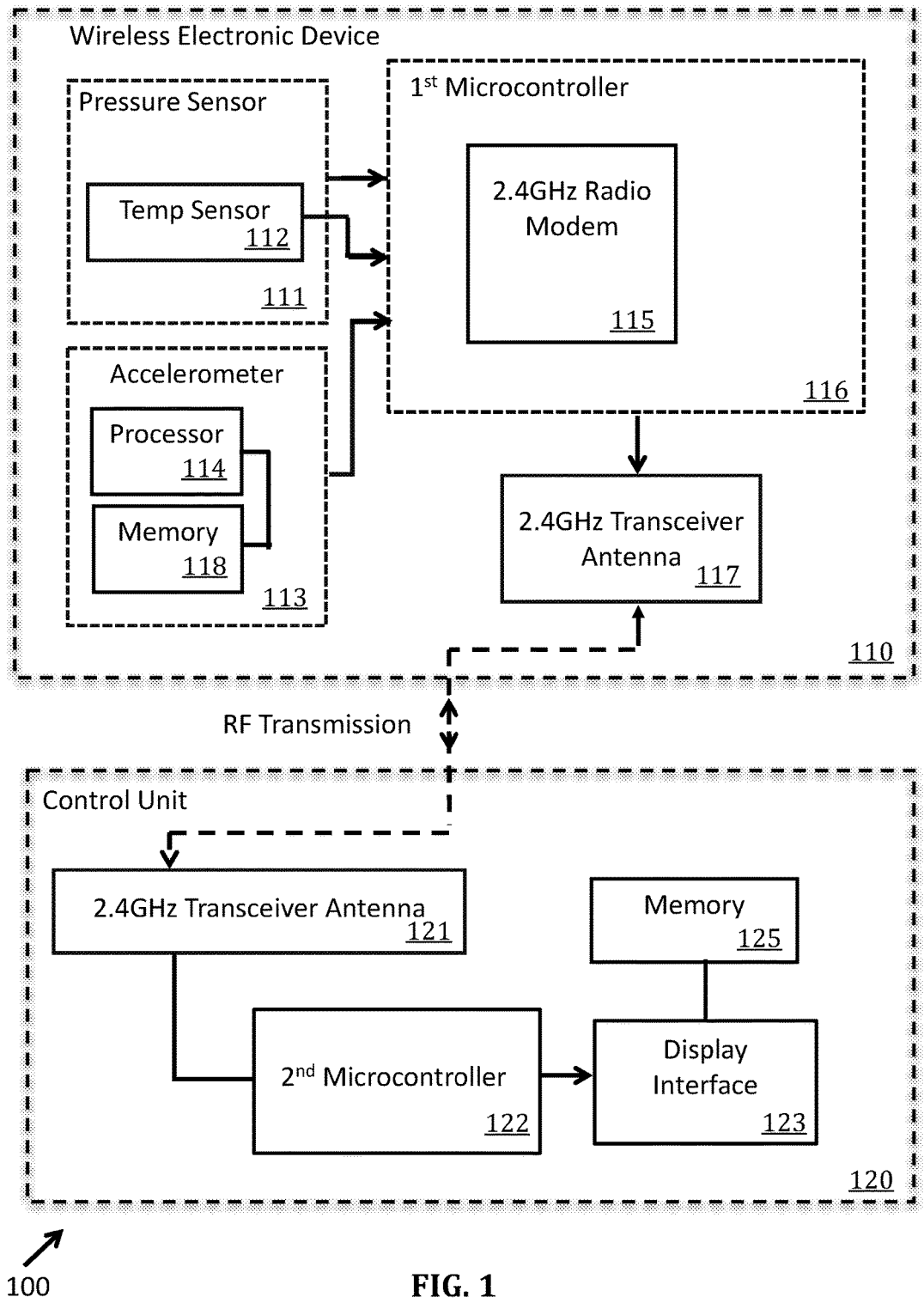
FIG. 1 shows a conceptual block diagram representative of the present system and includes optional pressure and temperature sensors.
Figure 2:
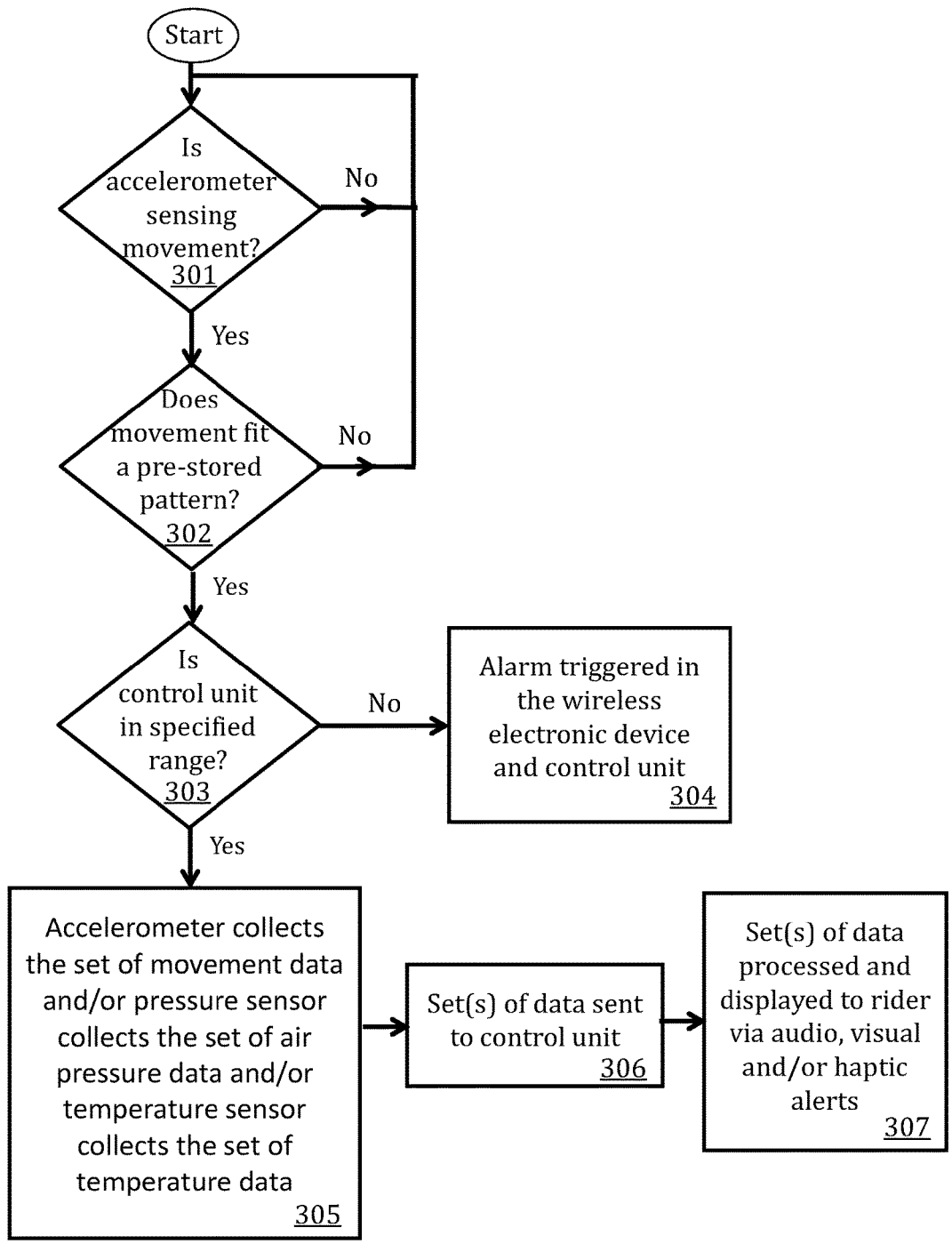
FIG. 2 shows a flow diagram that depicts an exemplary telemetry process of the present invention.

Referring now to FIGS. 1-2, the present invention features a wheel telemetry system (100) providing a set of riding information to a rider while riding a bicycle by measuring the acceleration of a wheel of the bicycle with respect to one or more of the x-, y-, or z-axes, defined with respect to the wheel. The set of riding information may aide the rider in monitoring riding performance by providing data comprising a rotation speed of the wheel, a type of riding surface, a ground speed of the bicycle, sudden acceleration or deceleration events, or a combination thereof. In some embodiments, the system (100) comprises a wireless electronic device (110) attached to any part of the wheel of the bicycle. It may be appreciated that different configurations are possible, for example, the wireless electronic device (110) may be attached to either the front wheel or to the rear wheel of the bicycle. Alternatively, both the front and rear wheels may each have a wireless electronic device (110) disposed thereon. The following description of the present invention is inclusive of all the aforementioned configurations, and accordingly, the term wheel(s) is employed.

In further embodiments, the wireless electronic device (110) comprises an accelerometer (113) having an on-board motion activated logic processor (114) and a first memory repository (118) operatively connected to said logic processor (114). In an embodiment, the first memory repository (118) stores a set of movement patterns defining allowable movements of the wheel(s) that will activate the accelerometer (113) to sense and collect a set of movement data. A movement pattern may be the z-axis with an accelerometer reading of 5G (i.e., 5 times standard gravity, 9.8 m/s$^2$) or more while acceleration in the x-axis and y-axis show half or less that amount. This would indicate that someone is attempting to ride the bike and the bicycle is not simply shaking from being on a car mounted bike carrier (e.g., while the car drives over pot holes). A non-limiting example of an allowable movement may include movement in the z-axis (spin) with a large enough acceleration reading in one direction to indicate movement of the bicycle wheel, while readings from the x- and y- axis show the bicycle is in a ridable position in relation to the road surface.

In preferred embodiments, the set of movement data comprises the measurement of the acceleration. In other embodiments, a default mode of the accelerometer is a sensing mode.

In additional embodiments, the wireless electronic device (110) further comprises a first microcontroller (116) operatively connected to the accelerometer (113) and a first transceiver antenna (117) operatively connected to the first microcontroller (116). In an embodiment, a radio modem (115) is integrated into the first microcontroller (116).

In supplementary embodiments, a control unit (120) is wirelessly connected to the wireless electronic device (110). In exemplary embodiments, the control unit (120) comprises a second transceiver antenna (121) wirelessly connected to the first transceiver antenna (117), a second microcontroller (122) operatively coupled to the second transceiver antenna (121), a display interface operatively connected to the second microcontroller (122), and a second memory repository (125) operatively connected to the display interface (123).

Consistent with previous embodiments, when the accelerometer (113) senses a movement of the wheel(s), the accelerometer (113) transmits a first signal to wake up the logic processor (114). The logic processor (114) may then acquire the movement and compare the movement to each movement pattern in the set of movement patterns. In some embodiments, if the movement does not fit any movement pattern, then the accelerometer (113) continues to operate in the sensing mode and the first microcontroller (116) and control unit (120) continue in the inactive sleep mode. In this way, the system (100) is kept from processing and storing data resulting from minor or accidental movements of the bicycle, thus saving power in the system (100).

Further, if the movement of the wheel(s) does fit one of the movement patterns, then the logic processor (114) may send a second signal to wake up the first microcontroller (116) and the accelerometer (113) may collect the set of movement data. In other embodiments, the set of movement data is modulated by the radio modem (115) of the first microcontroller (116) to produce a set of modulated data. The first transceiver antenna (117) may then transmit the set of modulated data to the second transceiver antenna (121), which subsequently transmits the set of modulated data to the second microcontroller (122). In further embodiments, the set of modulated data is demodulated and processed by the second microcontroller (122) to produce the set of riding information. The set of riding information may then be communicated to the rider, while riding the bicycle, via the display interface (123) and/or stored by the second memory repository (125) for future review. In additional embodiments, the display interface (123) communicates the set of riding information to the rider via an audio, visual, and/or haptic alert.

In an embodiment, the first (117) and second (121) transceiver antennas operate at 2.4 GHz. In this configuration, the radio modem (115) may be a 2.4 GHz radio modem and wireless communications between the transceiver antennas (117,121) are transmitted via a radio frequency ("RF") transmission. In another embodiment, a first battery is operatively connected to the wireless electronic device (110) and a second battery is operatively connected to the control unit (120) for supplying power to the system (100). In another embodiment, a solar panel is operatively connected to the first battery for charging the first battery and thus extending a run time of the system (100).

In a supplementary embodiment, acceleration with respect to the y-axis (i.e., movement of the wheel(s) up and down) is used to determine the riding surface. Sudden random movements along the y-axis may indicate a non-paved surface while long periods of relatively small movements may indicate a paved surface. In another embodiment, a sudden but predictable change in acceleration and/or deceleration may be determined by detecting the flexure of the sidewalls of the wheel(s) as the part of the wheel(s) on which the wireless electronic device (110) is mounted passes over the ground surface. As the flexure event happens twice per rotation the rotation speed (in rotations per minute) of the wheel(s) and the ground speed of the bicycle may be thereby determined. Z-axis information can be used by receiving device along with wheel diameter to determine wheel rpm. Z-axis data may also provide data about the surface of the road. Further, excess rider movement from side to side may be monitored and reported to help prevent the rider from wasting energy In some embodiments, a pressure sensor (111) is operatively connected to the first microcontroller (116) for monitoring a pressure of the wheel(s) by collecting a set of air pressure data. In other embodiments, the pressure sensor (111) has an onboard temperature sensor (112) for monitoring a temperature of the wheel(s) by collecting a set of temperature data. The set of temperature data and/or the set of air pressure data may be displayed via the display interface (123) and/or stored by the second memory repository (125) for future review. In further embodiments, based on a user-defined setting, the display interface (123) alerts the rider of an abnormal pressure within the wheel(s) via the audio, visual, and/or haptic alert. To collect the set of air pressure data, the system (100) may be connected to the pressurized environment of the wheel (e.g., the valve stem (inside or out) or on the rim of the wheel for tubeless tire applications).

In additional embodiments, the system (100) may be employed to provide security to the bicycle, where movement of a previously motionless bicycle triggers an alarm when the wireless electronic device (110) is not detected within a given proximity to the control unit (120). Based on user settings, the rider may be notified of undesired movement or patterns of movement of the wheel(s) via the audio, visual, and/or haptic alert. More specifically, when in security mode, the system (100) may operate as follows: when the accelerometer (113) senses the movement of the wheel(s), the accelerometer may trigger a third signal to wake up the logic processor (114), which then sends a fourth signal to wake up the first microcontroller (116). In an embodiment, the first microcontroller (116) activates the first transceiver antenna (117) to acquire a fifth signal being transmitted by the second transceiver antenna (121). The first microcontroller may then determine a strength of the fifth signal. In a preferred embodiment, if the strength is below a given threshold or if the first transceiver antenna (117) is unable to acquire the fifth signal, then an audible alarm operatively connected to the first microcontroller (116) is triggered and/or an alarm signal is transmitted to the control unit (120) to trigger the audio, visual, and/or haptic alert. The strength of the fifth signal, transmitted by the second transceiver antenna (121), may be directly related to the distance the wireless electronic device (110) is from the control unit (120). More specifically, a weaker signal may indicate a greater distance. Therefore, defining a threshold for the signal strength is equivalent to defining a specified range or distance within which the wireless electronic device (110) must be from the control unit (120). To illustrate, if the wheels of the bicycle are moving, then the rider should be the source of the movement; and so, the control unit (120) (which is disposed on the rider or the bicycle) must be in relatively close proximity to the wireless electronic device (110) (which is disposed on the front and/or rear wheel of the bicycle). If, however, the rider is not the source of the movement and the rider is outside said relative close proximity, then the audible alarm is triggered and/or the alarm signal is transmitted to the control unit (120) to trigger the audio, visual, and/or haptic alert.

The present invention additionally features a system for providing a set of air pressure data, comprising an air pressure of a wheel of a bicycle, to a rider while riding the bicycle. In some embodiments, the system (100) comprises a wireless electronic device (110) attached to a wheel of the bicycle. As the bicycle comprises a wheel and a rear wheel, in alternate configurations the wheel may be the front and/or rear wheel. Therefore, to accommodate each possible configuration, the wheel will be hereinafter referred to as a wheel(s).

In further embodiments, the wireless electronic device (110) comprises an accelerometer (113) having an on-board motion activated logic processor (114) and a first memory repository (118) operatively connected to said logic processor (114). In an embodiment, the first memory repository (118) stores a set of movement patterns defining allowable movements of the wheel(s) that will activate the accelerometer (113) to sense and collect a set of movement data. In another embodiment, the set of movement data comprises a measurement of the acceleration of the wheel(s) with respect to one or more of the x-, y-, or z-axes. In other embodiments, a default mode of the accelerometer is a sensing mode.

In additional embodiments, the wireless electronic device (110) further comprises: a first microcontroller (116) operatively connected to the accelerometer (113); a first transceiver antenna (117) operatively connected to the first microcontroller (116); and a pressure sensor (111) operatively connected to the first microcontroller (116). In an embodiment, a radio modem (115) is integrated into the first microcontroller (116).

In supplementary embodiments, a control unit (120) is wirelessly connected to the wireless electronic device (110). In exemplary embodiments, the control unit (120) comprises a second transceiver antenna (121) wirelessly connected to the first transceiver antenna (117), a second microcontroller (122) operatively coupled to the second transceiver antenna (121), a display interface (123) operatively connected to the second microcontroller (122), and a second memory repository (125) operatively connected to the display interface (123).

Consistent with previous embodiments, when the accelerometer (113) senses a movement of the wheel(s), the accelerometer transmits a first signal to wake up the logic processor (114). The logic processor (114) may then acquire the movement and compare the movement to each movement pattern in the set of movement patterns. In some embodiments, if the movement does not fit any movement pattern, then the accelerometer (113) continues to operate in the sensing mode and the first microcontroller (116) and control unit (120) continue in the inactive sleep mode. In this way, the system (100) is kept from processing and storing data resulting from minor or accidental movements of the bicycle, thus saving power in the system (100).

Further, if the movement of the wheel(s) does fit one of the movement patterns, the logic processor (114) may send a second signal to wake up the first microcontroller (116). The accelerometer (113) may then collect the set of movement data and the pressure sensor (111) may collect the set of air pressure data. In other embodiments, the set of movement data and the set of air pressure data are transmitted to the first microcontroller (116) for modulation via the radio modem (115) to produce a collective set of modulated data. The first transceiver antenna (117) may then transmit the collective set of modulated data to the second transceiver antenna (121), which subsequently transmits the collective set of modulated data to the second microcontroller (122). In further embodiments, the collective set of modulated data is demodulated and processed via the second microcontroller (122) to acquire the set of movement data and the set of air pressure data. The set of movement data and the set of air pressure data may then be communicated to the rider, while riding the bicycle, via the display interface (123) and/or stored by the second memory repository (125) for future review. In an embodiment, the display interface (123) communicates the set of movement data and the set of air pressure data to the rider via an audio, visual, and/or haptic alert. In another embodiment, the display interface (123) alerts the rider of an abnormal pressure within the wheel(s) via the audio, visual, and/or haptic alert based on a user-defined setting.

In other embodiments, the first (117) and second (121) transceiver antennas operate at 2.4 GHz. In this configuration, the radio modem (115) may be a 2.4 GHz radio modem.

In additional embodiments, a first battery is operatively connected to the wireless electronic device (110) and a second battery is operatively connected to the control unit (120) for supplying power to the system (100). In another embodiment, a solar panel is operatively connected to the first battery for charging the first battery and thus extending a run time of the system (100).

In supplementary embodiments, the pressure sensor (111) has an onboard temperature sensor (112) for monitoring a temperature of the wheel(s) by collecting a set of temperature data. The set of temperature data may be displayed via the display interface (123) and/or stored by the second memory repository (125) for future review.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A wheel telemetry system (100) for providing a set of riding information to a rider while riding a bicycle by measuring an acceleration of a wheel of the bicycle with respect to one or more of an x-, y-, or z-axis, defined with respect to the wheel, wherein the set of riding information aides the rider in monitoring riding performance by providing data comprising a rotation speed of the wheel, a type of riding surface, a ground speed of the bicycle, sudden acceleration or deceleration events, or a combination thereof, said system (100) comprising:
 (a) a wireless electronic device (110), attached to the wheel of the bicycle, comprising:
  (i) an accelerometer (113) having an on-board motion activated logic processor (114) and a first memory repository (118) operatively connected to said logic processor (114), wherein the first memory repository (118) stores a set of movement patterns defining allowable movements of the wheel that will activate the accelerometer (113) to sense and collect a set of movement data comprising said measurement of the acceleration, wherein a default mode of the accelerometer is a sensing mode;
  (ii) a first microcontroller (116) operatively connected to the accelerometer (113) having a radio modem (115) integrated therein, wherein a default mode of the first microcontroller (116) is an inactive sleep mode; and
  (iii) a first transceiver antenna (117) operatively connected to the first microcontroller (116); and
 (b) a control unit (120) having the inactive sleep mode as a unit default mode, wherein the control unit (120) comprises,
  (i) a second transceiver antenna (121) wirelessly connected to the first transceiver antenna (117);
  (ii) a second microcontroller (122) operatively connected to the second transceiver antenna (121);
  (iii) a display interface operatively connected to the second microcontroller (122); and
  (iv) a second memory repository (125) operatively connected to the display interface,
wherein when the accelerometer (113) senses a movement of the wheel, the accelerometer (113) transmits a first signal to wake up the logic processor (114), wherein the logic processor (114) then acquires the movement and compares it to each movement pattern in the set of movement patterns, wherein if the movement does not fit any movement pattern, then the accelerometer (113) continues to operate in the sensing mode and the first microcontroller (116) and control unit (120) continue in the inactive sleep mode, thereby keeping the system (100) from processing and storing data resulting from minor or accidental movements of the bicycle, thus saving power in the system (100),
wherein if the movement of the wheel fits one of the movement patterns, then the logic processor (114) sends a second signal to wake up the first microcontroller (116) and the accelerometer (113) collects the set of movement data, which is then modulated by the radio modem (115) of the first microcontroller (116) to produce a set of modulated data, wherein the first transceiver antenna (117) transmits the set of modulated data to the second transceiver antenna (121), wherein the set of modulated data is demodulated and processed by the second microcontroller (122) to produce the set of riding information, which is communicated to the rider while riding the bicycle via the display interface (123) or stored by the second memory repository (125).

2. The system (100) of claim 1, wherein the system (100) comprises one or more wireless electronic devices each attached to a wheel of the bicycle, a rear wheel of the bicycle, or both the wheel and the rear wheel.

3. The system (100) of claim 1, wherein the first (117) and second (121) transceiver antennas operate at 2.4 GHz.

4. The system (100) of claim 3, wherein the radio modem is a 2.4 GHz radio modem.

5. The system (100) of claim 1, wherein the display interface (123) communicates the set of riding information to the rider via an audio, visual, and/or haptic alert.

6. The system (100) of claim 2 further comprising a pressure sensor (111) operatively connected to the first microcontroller (116) for monitoring a pressure of the wheel by collecting a set of air pressure data, wherein the set of air pressure data is communicated to the rider while riding the bicycle via the display interface (123) or stored by the second memory repository (125).

7. The system (100) of claim 6, wherein the pressure sensor (111) has an onboard temperature sensor (112) for monitoring a temperature of the wheel by collecting a set of temperature data, wherein the set of temperature data is communicated to the rider while riding the bicycle via the display interface (123) or stored by the second memory repository (125).

8. The system (100) of claim 6, wherein, based on a user-defined setting, the display interface (123) alerts the rider of an abnormal air pressure within the wheel via the audio, visual, and/or haptic alert.

9. The system (100) of claim 1 further comprising a first battery operatively connected to the wireless electronic device (110) and a second battery operatively connected to the control unit (120) for supplying said power to the system (100).

10. The system (100) of claim 9, wherein a solar panel is operatively connected to the battery for charging the battery and thus extending a run time of the system (100).

11. The system (100) of claim 2, wherein in security mode, the system (100) operates as follows: when the accelerometer (113) senses the movement of the wheel, the accelerometer triggers a third signal to wake up the logic processor (114), which then sends a fourth signal to wake up the first microcontroller (116), wherein the first microcontroller (116) activates the first transceiver antenna (117) to acquire a fifth signal being transmitted by the second transceiver antenna (121), wherein the first microcontroller determines a strength of the fifth signal, wherein if the strength is below a given threshold or if the first transceiver antenna (117) is unable to acquire the fifth signal, then an audible alarm operatively connected to the first microcontroller (116) is triggered and/or an alarm signal is transmitted to the control unit (120) to trigger the audio, visual, and/or haptic alert.

12. The system of claim 1, wherein the acceleration with respect to the y-axis is used to determine the type of riding surface.

13. A system (100) for providing a set of air pressure data, comprising an air pressure of a wheel of a bicycle, to a rider while riding the bicycle, said system (100) comprising:
   (a) a wireless electronic device (110), attached to the wheel of the bicycle, comprising:
      (i) an accelerometer (113) having an on-board motion activated logic processor (114) and a first memory repository (118) operatively connected to said logic processor (114), wherein the first memory repository (118) stores a set of movement patterns defining allowable movements of the wheel that will activate the accelerometer (113) to sense and collect a set of movement data comprising a measurement of an acceleration of the wheel with respect to one or more of an x-, y-, or z-axis, wherein a default mode of the accelerometer is a sensing mode;
      (ii) a first microcontroller (116) operatively connected to the accelerometer (113) having a radio modem (115) integrated therein, wherein a default mode of the first microcontroller (116) is an inactive sleep mode;
      (iii) a first transceiver antenna (117) operatively connected to the first microcontroller (116); and
      (iv) a pressure sensor (111) operatively connected to the first microcontroller (116); and
   (b) a control unit (120) having the inactive sleep mode as a unit default mode, wherein the control unit (120) comprises,
      (i) a second transceiver antenna (121) wirelessly connected to the first transceiver antenna (117);
      (ii) a second microcontroller (122) operatively connected to the second transceiver antenna (121);
      (iii) a display interface operatively connected to the second microcontroller (122); and
      (iv) a second memory repository (125) operatively connected to the display interface,
   wherein when the accelerometer (113) senses a movement of the wheel, the accelerometer (113) transmits a first signal to wake up the logic processor (114), wherein the logic processor (114) then acquires the movement and compares it to each movement pattern in the set of movement patterns, wherein if the movement does not fit any movement pattern, then the accelerometer (113) continues to operate in the sensing mode and the first microcontroller (116) and control unit (120) continue in the inactive sleep mode, thereby keeping the system (100) from processing and storing data resulting from minor or accidental movements of the bicycle, thus saving power in the system (100),
   wherein if the movement of the wheel fits one of the movement patterns, then the logic processor (114) sends a second signal to wake up the first microcontroller (116), wherein the accelerometer (113) then collects the set of movement data and the pressure sensor (111) collects the set of air pressure data, wherein the set of movement data and the set of air pressure data are transmitted to the first microcontroller (116) for modulation via the radio modem (115) to produce a collective set of modulated data, wherein the first transceiver antenna (117) transmits the collective set of modulated data to the second transceiver antenna (121), wherein the collective set of modulated data is demodulated and processed by the second microcontroller (122), wherein the set of movement data and the set of air pressure data are communicated to the rider while riding the bicycle via the display interface (123) or stored by the second memory repository (125).

14. The system (100) of claim 13, wherein the system (100) comprises one or more wireless electronic devices each attached to a wheel of the bicycle, a rear wheel of the bicycle, or both the wheel and the rear wheel.

15. The system (100) of claim 13, wherein the first (117) and second (121) transceiver antennas operate at 2.4 GHz and the radio modem (115) is a 2.4 GHz radio modem.

16. The system (100) of claim 13, wherein the display interface (123) communicates the set of movement data and the set of air pressure data to the rider via an audio, visual, and/or haptic alert.

17. The system (100) of claim 13, wherein, based on a user-defined setting, the display interface (123) alerts the rider of an abnormal pressure within the wheel via the audio, visual, and/or haptic alert.

The system (100) of claim 13, wherein the pressure sensor (111) has an onboard temperature sensor (112) for monitoring a temperature of the wheel by collecting a set of temperature data, wherein the set of temperature data is communicated to the rider while riding the bicycle via the display interface (123) or stored by the second memory repository (125).

18. The system (100) of claim 13 further comprising a first battery operatively connected to the wireless electronic device (110) and a second battery operatively connected to the control unit (120) for supplying said power to the system (100).

19. The system (100) of claim 18, wherein a solar panel is operatively connected to the battery for charging the battery and thus extending a run time of the system (100).

\* \* \* \* \*